US005886626A

United States Patent [19]

Hynes et al.

[11] Patent Number: 5,886,626

[45] Date of Patent: Mar. 23, 1999

[54] SYSTEM AND METHOD FOR PERFORMING JAMMING TESTING ON COMMUNICATION NETWORKS

[75] Inventors: Mark W. Hynes, Sierra Vista; James L. Cole, Tucson; Barry C. Miller, Sierra Vista; Scott A. Morris, Sierra Vista; Robert E. Reiner, Sierra Vista, all of Ariz.

[73] Assignee: The United States of America as represented by the Secretary of the Army, Washington, D.C.

[21] Appl. No.: 942,120

[22] Filed: Oct. 1, 1997

Related U.S. Application Data

[60] Provisional application No. 60/033,210, Nov. 29, 1996.

[51] Int. Cl.[6] .................. G01S 7/38

[52] U.S. Cl. .................. 342/169; 342/13; 342/14; 342/170; 342/171; 434/5

[58] Field of Search .................. 342/13, 14, 169, 342/170, 171, 172, 173, 174; 434/2, 5

[56] References Cited

U.S. PATENT DOCUMENTS

| | | | |
|---|---|---|---|
| 4,192,082 | 3/1980 | Deaton et al. | 434/2 |
| 5,133,663 | 7/1992 | Willingham et al. | 434/2 |
| 5,150,127 | 9/1992 | Aw | 342/169 |
| 5,313,209 | 5/1994 | Michaels, Jr. et al. | 342/13 |
| 5,341,146 | 8/1994 | Vennum et al. | 342/170 |
| 5,378,155 | 1/1995 | Eldridge | 434/11 |
| 5,583,509 | 12/1996 | Hynes et al. | 342/169 |

*Primary Examiner*—John B. Sotomayor
*Attorney, Agent, or Firm*—William R. Medsger

[57] ABSTRACT

A system is tested for jamming resistance by supplying a simulated jamming signal. The simulated jamming signal is produced by calculating a propagation path loss in the terrain between the system under test and a location where the jammer would be, predicting a jamming level in accordance with the propagation path loss, and generating a simulated jamming signal. The simulated jamming signal is supplied to the antenna port of the system under test. The testing does not require the use of either a real jammer or a pilot signal generator at the location where the jammer would be.

11 Claims, 2 Drawing Sheets

SYSTEM AND METHOD FOR PERFORMING JAMMING TESTING ON COMMUNICATION NETWORKS

This application is a non-provisional application claiming benefit of provisional application No. 60/033,210 filed Nov. 29, 1996 entitled ADVANCED DISTRIBUTED ELECTRONIC WARFARE SYSTEM and herein incorporated by reference.

FIELD OF THE INVENTION

The present invention is directed to a system and method for performing realistic jamming testing on networks of communication systems without the need to deploy jammers.

DESCRIPTION OF RELATED ART

Testing and training for vulnerability to jamming are known in the field of $C^4$IEW (command, control, communications, computers, intelligence, and electronic warfare). One system for doing so, called the Covert Remote Electronic Warfare Simulator (CREWS), is disclosed in U.S. Pat. No. 5,341,146, issued Aug. 23, 1994, to Vennum et al. The known CREWS includes a simulator apparatus interconnected between a receiving antenna of a system under test (SUT), or "victim," and the transceiver of the "victim" to provide a simulated jamming signal. The known CREWS uses a transmitted pilot tone to determine propagation effects on the jamming signal; thus, the known CREWS requires deployment of a jammer platform to transmit such a pilot tone.

SUMMARY OF THE INVENTION

An object of the invention is to provide a jammer simulator for $C^4$IEW and other purposes that can simulate a jammer signal without the need to generate a pilot tone or the concomitant deployment of a jammer platform.

To achieve this and other objects, the present invention is directed to a device for simulating an effect of a jammer on a system under test under an assumption that the jammer is disposed at a first given location and the system under test is disposed at a second given location, the device comprising: host means for calculating, in accordance with data describing a terrain between the first given location and the second given location and data describing the jammer, a propagation path loss that would be suffered by a jamming signal sent from the jammer to the system under test if the jammer were in use and for predicting a jamming level in accordance with the propagation path loss; jammer simulating means for generating a simulated jamming signal in accordance with the jamming level predicted by the host means, the simulated jamming signal simulating a signal that would be received from the jammer by the system under test if the jammer were in use; and coupling means for supplying the simulated jamming signal to the system under test.

The invention is further directed to a method for simulating an effect of a jammer on a system under test under an assumption that the jammer is disposed at a first given location and the system under test is disposed at a second given location, the method comprising: (a) calculating, in accordance with data describing a terrain between the first given location and the second given location and data describing the jammer, a propagation path loss that would be suffered by a jamming signal sent from the jammer to the system under test if the jammer were in use and for predicting a jamming level in accordance with the propagation path loss; (b) generating a simulated jamming signal in accordance with the jamming level predicted in step (a), the simulated jamming signal simulating a signal that would be received from the jammer by the system under test if the jammer were in use; and (c) supplying the simulated jamming signal to the system under test.

A particular implementation of the present invention is called the Advanced Distributed Electronic Warfare System (ADEWS). The ADEWS is a system for performing realistic jamming testing on networks of communication systems without the requirement to deploy the threat jammer systems. The ADEWS concept builds upon the original CREWS concept, improving the CREWS and adding a new operation for determining the jammer input level to the system under test (SUT) which eliminates the need to deploy a jammer platform to transmit the CREWS's pilot tone. An improved CREWS communicates with a host computer, which determines the level of jamming to inject into the SUT to replicate the jamming signal received from a virtual jammer. The ADEWS uses the jammer state and location information transmitted to the CREWS via the Test Control Center (TCC) to model the level.

The virtual jammer sends protocol data units (PDU's) describing its position, jamming state, and jammer parameters to the host computer via the TCC. The TCC receives the jammer PDU's and forwards them to the host computer. The host computer runs a terrain propagation path loss (TPPL) model to determine the received jammer level at the SUT and, then sends commands to the CREWS to set up the parameters and level of the jamming signal. The CREWS generates and injects the jamming waveform into the SUT. The TPPL accurately accounts for the terrain effects on propagation based on the position of the jammer and the SUT. Multiple jammers can be modeled, with the CREWS injecting the combined jamming signals into the SUT.

The ADEWS provides a realistic jamming environment to communications systems for electronic warfare testing and training without a need for deploying high power jammers or deploying the pilot tone platforms, as required by the known CREWS.

Present jamming implementations lack realism, low cost, flexibility, low power, unlimited time and location of use, and distributed capability. The present invention circumvents these limitations in the following manner.

Realism: Because the ADEWS uses a terrain propagation path loss model, multiple simultaneous jammers can be modeled and a combined jamming waveform produced, allowing replication of a realistic threat situation containing multiple jammers at different frequencies. The known CREWS uses a broadcast CW tone to determine the jamming level and, therefore, would require multiple receivers using different tone frequencies to accomplish the same result. Using a single tone would not produce a realistic result in this case.

Low Cost. The ADEWS reduces the cost of performing jamming testing because no jammer platform need be deployed, thus avoiding a disadvantage of the known CREWS, palletized jammers, and van-mounted jammers, which all require deployment of a jammer platform.

Flexibility: Since the ADEWS does not require the CW control tone or the jamming signal, there is no need to be concerned with obtaining frequency clearances for these radio frequency (RF) emissions, as would be necessary for the known CREWS, palletized jammers, or van-mounted jammers, all of which radiate RF signals into the atmosphere.

Low Power: Because the ADEWS generates the jamming signal at the location of each transceiver, the jamming power level is not reduced by the propagation effects imposed on the palletized jammer and van-mounted jammer configurations, which require high-power transmissions to overcome such propagation effects.

Unlimited Time and Location of Use: Known testing operations using palletized jammers or van-mounted jammers must be conducted in remote areas and late at night to reduce the probability of interference with other systems. Certain frequencies are excluded from the allowed jamming waveforms because the slightest possibility of interference with these frequencies could have very harmful effects. Nonetheless, full spectrum testing is desirable to achieve a realistic effect on the victim transceivers. The ADEWS does not have such a limitation because of the direct injection technique used. Since no jamming signals are radiated, there is no possibility of interference with other systems. Thus, training exercises can be conducted anywhere and at any time.

Distributed Capability: The ADEWS adds the ability to perform distributed testing. That is, the virtual jammer can be located at another range and the jamming protocol data units (PDU's) transmitted to the CREWS over a network link.

BRIEF DESCRIPTION OF THE DRAWINGS

A preferred embodiment of the invention will now be described in detail with reference to the drawings, in which.

DETAILED DESCRIPTION OF THE PREFERRED EMBODIMENT

Figure 1:
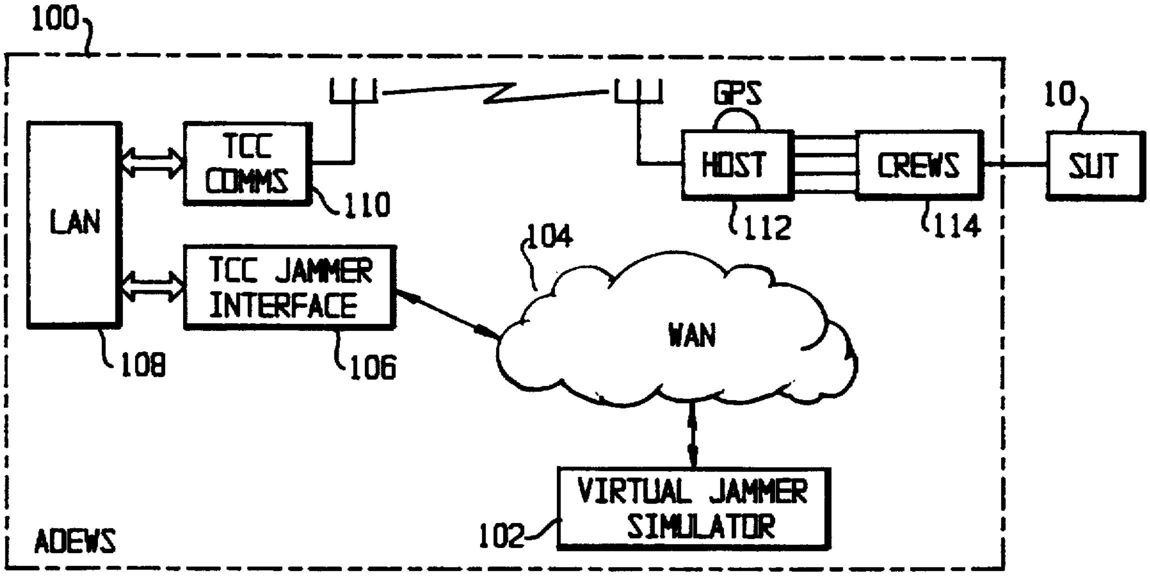
FIG. 1 shows a block diagram of a system according to the preferred embodiment.

The ADEWS 100, shown in FIG. 1, incorporates a virtual jammer simulator (VJ) 102 which communicates via a wide area network (WAN) 104 through a Test Control Center (TCC) interface 106 to a local area network (LAN) 108. The jammer characteristics (specific jammer signal information) set up at the virtual jammer 102 are then transmitted via TCC communications 110 to a host computer 112, which is connected via CREWS 114 to victim system under test (SUT) 10.

The various components shown in FIG. 1 perform the following functions. The VJ communicates entities, attributes, and actions describing the jammer by means of Distributed Interactive Simulation (DIS) Protocol Data Units (PDUs). The TCC receives, disassembles, and broadcasts the jammer PDUs to the host computer. The host computer receives the VJ entities and events and determines the receive level of the jamming signal at the SUT by performing terrain propagation modeling. The host computer commands the CREWS to produce signals required to replicate the receive jamming waveform.

CREWS 114 is the jamming signal simulator. This device has the capability to inject realistic jamming waveforms into a victim receiver with amplitude being controlled by a host computer which provides waveform and signal level information derived from the terrain propagation model. The CREWS may also use a continuous wave (CW) control tone being broadcast by a surrogate jammer or a prerecorded time-ordered scenario to determine the jammer signal level to inject into the SUT.

An example of the operation of the system of FIG. 1 will now be given. Entity PDU's (PDU's describing the characteristics of virtual jammer entities) are transmitted by the VJ, telling the TCC that three virtual jammers will participate in the simulation. The VJ then provides a succession of activity and emission PDU's which disclose the location and activity of the jammers. For example, the activity and emission PDU's may indicate that two jammers are active and that one jammer is in movement to a new location. The VJ continues to broadcast PDU's on a state change basis or at a predetermined minimum level when no changes are occurring.

The DIS PDU gateway of the TCC translates the actions of the virtual jammers into terrain propagation path loss (TPPL) modeling parameter inputs. TPPL modeling by the host computer determines the proper jammer signal levels at each victim receiver.

The host computer is equipped with a Global Positioning System (GPS) receiver for position location data and timing. The position of each of the victims is used in the TPPL modeling.

Figure 2:
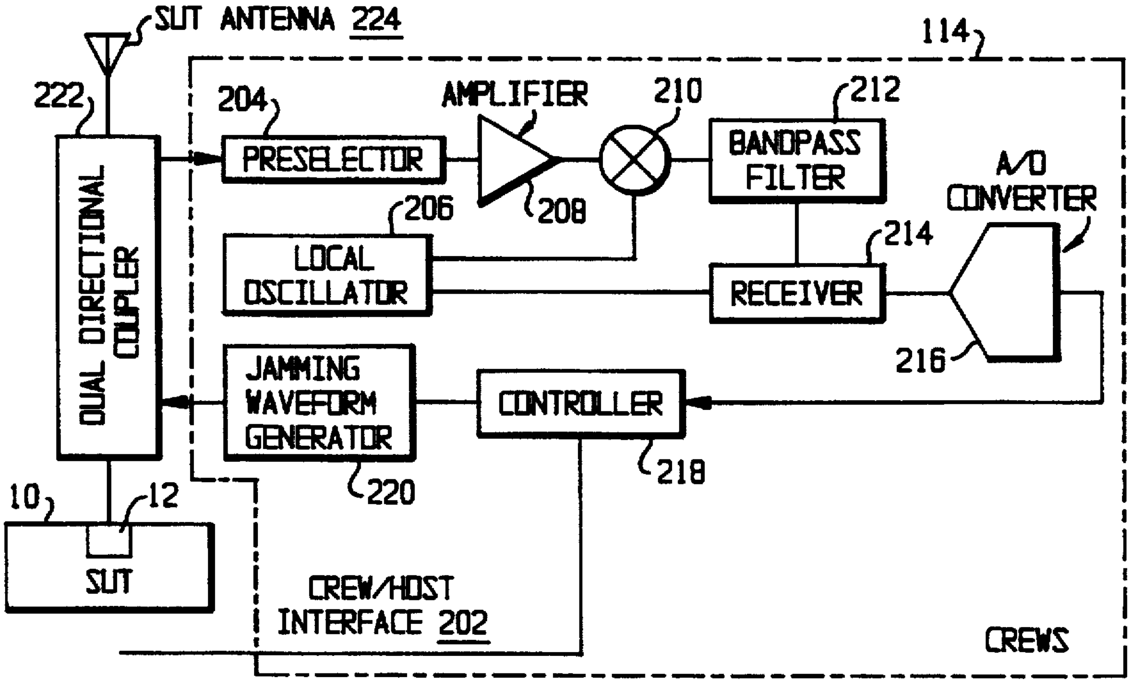
FIG. 2 shows a covert remote electronic warfare simulator used in the system of FIG. 1.

FIG. 2 shows a block diagram of CREWS 114. The basic concepts of the CREWS are known in the art, having been described in U.S. Pat. No. 5,341,146, herein incorporated by reference; therefore, they will not be repeated here. Instead, the CREWS 114 will be described primarily in terms of its differences from the known CREWS.

In FIG. 2, SUT 10 is shown with dual directional coupler 222 and SUT antenna 224. SUT antenna 224 is connected to SUT 10 by way of dual directional coupler 222 and antenna port 12 on SUT 10. CREWS 114 is shown with preselector 204, local oscillator 206, amplifier 208, mixer 210, bandpass circuit 212, receiver 214, analog-to-digital converter 216, controller 218, and jamming waveform generator 220.

CREWS 114 has been modified from that known in the art by the addition of CREWS/host interface 202 for connecting controller 218 with a host computer. Interface 202 allows the CREWS to receive control signals from the host computer to control the jamming input from jamming waveform generator 220 to SUT 10 via dual directional coupler 222.

Also, dual directional coupler 222 replaces the signal input separator and diplexer of the above-referenced patent. The dual directional coupler provides a more effective, less intrusive way of interfacing with the SUT.

The CREWS, although still capable of operating using the control tone (live mode), can now operate without the presence of the control tone (virtual mode), eliminating the requirement to transmit the control tone. In the virtual mode, the host computer calculates the power level of the jammer, based on the location of the jammer and SUT, jammer parameters, and intervening terrain. Jammer power level calculations are performed in real time, and the jammer power level commands are sent via the CREWS/host interface to the CREWS, which sets the power level of the jammer. The CREWS then generates the jamming waveform at the proper power level and injects it into the SUT antenna port via the dual directional coupler.

Figure 3:
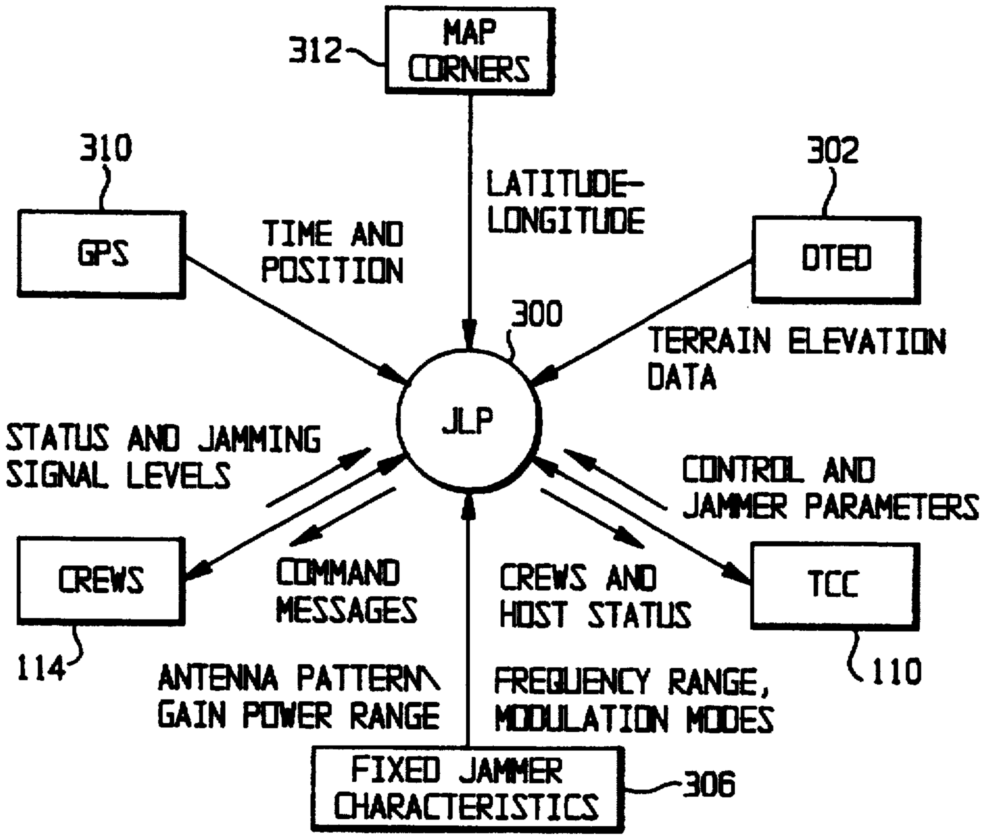
FIG. 3 shows a block diagram of components of the software used to control the covert remote electronic warfare simulator of FIG. 2.

The host computer contains the software which calculates the jamming level and controls the CREWS. FIG. 3 shows a top-level process diagram of the Real-Time Jamming Level Predictor (JLP) software used in the host computer, showing the software data flows, external systems, and data sources. More specifically, FIG. 3 shows the flow of data between JLP software 300 and Digitized Terrain Elevation Data 302, TCC 110, fixed jammer characteristics 306, CREWS 114, GPS 310, and map corners 312. The JLP software 300 provides for:

Scenario initialization data—Digitized Terrain Elevation Data 302 for the exercise and the fixed jammer characteristics 306, namely, power range, antenna pattern/gain, frequency range, and modulation modes;

Receipt of real-time control and jammer location, variable parameters, and activity;

Transmission of CREWS and host status and location;

Calculation of jammer power level; and

Control of CREWS jammer parameters.

Contained within JLP are the following:

The Terrain Propagation Path Loss (TPPL) model;

The computation module for received jamming signal level;

The GPS get time and own location process;

The TCC input/output (I/O) process that formats and communicates data to and from the TCC;

The CREWS I/O process that formats and communicates data to and from the CREWS; and The record/playback process.

Figure 4:
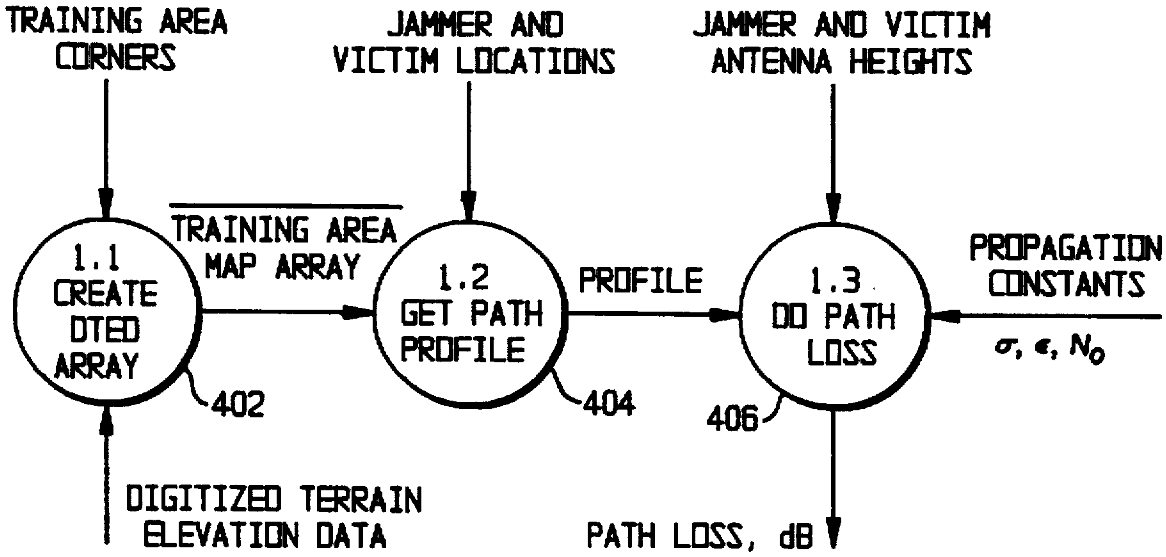
FIG. 4 shows a terrain propagation path loss model used by the software of FIG. 3.

A flow chart of the TPPL model is shown in FIG. 4. The TPPL model involves three steps:

Step 402, "Create DTED Array," which creates the training area elevation data array from the training area corners and DTED;

Step 404, "Get Path Profile," which determines the elevation points between the jammer and victim from their real-time locations and the elevation data array; and Step 406, "Do Path Loss," which determines the propagation path loss from the path profile, jammer and victim antenna heights, and the propagation constants for the training area.

The preferred embodiment should be considered to be illustrative rather than limiting. Those skilled in the art who have reviewed this disclosure will readily appreciate that modifications can be made within the scope of the invention. The host computer and the components of the CREWS can be implemented in any suitable systems. Elements disclosed as separate can be consolidated, while an element with multiple functions can be implemented as multiple elements. Modifications disclosed separately can be combined as needed. Therefore, the present invention should be construed as limited only by the appended claims.

What is claimed is:

1. A device for simulating an effect of a jammer on a system under test under an assumption that the jammer is disposed at a first given location and the system under test is disposed at a second given location, the device comprising:

host means for calculating, in accordance with data describing a terrain between the first given location and the second given location and data describing the jammer, a propagation path loss that would be suffered by a jamming signal sent from the jammer to the system under test if the jammer were in use and for predicting a jamming level in accordance with the propagation path loss;

jammer simulating means for generating a simulated jamming signal in accordance with the jamming level predicted by the host means, the simulated jamming signal simulating a signal that would be received from the jammer by the system under test if the jammer were in use; and coupling means for supplying the simulated jamming signal to the system under test.

2. A device as in claim 1, wherein the host means comprises means for:

(i) creating, from digitized terrain elevation data, a training area elevation data array indicating terrain elevations for a region including the first and second given locations;

(ii) deriving, from the training area elevation array, a path profile indicating elevation points between the first and second given locations; and (iii) calculating the propagation path loss from the path profile.

3. A device as in claim 1, wherein:

the system under test comprises an antenna port for attaching an antenna to the system under test; and the coupling means couples the jammer simulating means to the antenna port.

4. A device as in claim 3, wherein the coupling means comprises a dual directional coupler for allowing both the antenna and the jammer simulating means to be connected to the antenna port.

5. A device as in claim 1, wherein the jammer simulating means comprises means for predicting the jamming level as though the jammer and at least one additional jammer were in use simultaneously.

6. A device as in claim 1, further comprising:

a virtual jammer for providing the data describing the jammer; and network means for carrying the data describing the jammer from the virtual jammer to the host means.

7. A device as in claim 1 wherein the host means comprises GPS means for determining a position of the host, the second given location being determined in accordance with the position of the host as determined by the GPS means.

8. A method for simulating an effect of a jammer on a system under test under an assumption that the jammer is disposed at a first given location and the system under test is disposed at a second given location, the method comprising:

(a) calculating, in accordance with data describing a terrain between the first given location and the second given location and data describing the jammer, a propagation path loss that would be suffered by a jamming signal sent from the jammer to the system under test if the jammer were in use and for predicting a jamming level in accordance with the propagation path loss;

(b) generating a simulated jamming signal in accordance with the jamming level predicted in step (a), the simulated jamming signal simulating a signal that would be received from the jammer by the system under test if the jammer were in use; and (c) supplying the simulated jamming signal to the system under test.

9. A method as in claim 8, wherein step (a) comprises:

(i) creating, from digitized terrain elevation data, a training area elevation data array indicating terrain elevations for a region including the first and second given locations;

(ii) deriving, from the training area elevation array, a path profile indicating elevation points between the first and second given locations; and (iii) calculating the propagation path loss from the path profile.

10. A method as in claim 8, wherein:

the system under test comprises an antenna port for attaching an antenna to the system under test; and step (c) comprises supplying the simulated jamming signal to the antenna port.

11. A method as in claim 8, wherein step (b) comprises predicting the jamming level as though the jammer and at least one additional jammer were in use simultaneously.

* * * * *